United States Patent [19]

Janisch et al.

[11] Patent Number: 4,862,850
[45] Date of Patent: Sep. 5, 1989

[54] IDLE DETECTOR FOR INTERNAL COMBUSTION ENGINE

[75] Inventors: Darrel R. Janisch, Thief River Falls; Fredric H. Bernier, St. Hilaire, both of Minn.

[73] Assignee: Arctco, Inc., Thief River Falls, Minn.

[21] Appl. No.: 233,193

[22] Filed: Aug. 17, 1988

[51] Int. Cl.$^4$ .............................................. F02M 17/34
[52] U.S. Cl. .............................. 123/198 DC; 261/44.4
[58] Field of Search .... 123/198 D, 198 DC, 198 DB, 123/334, 459, 494; 261/44.3, 44.4, DIG. 17; 73/242

[56] References Cited

U.S. PATENT DOCUMENTS

| | | | |
|---|---|---|---|
| 3,722,491 | 3/1973 | Maeda | 123/198 D |
| 4,043,198 | 8/1977 | Sotillwell et al. | 73/242 |
| 4,304,201 | 12/1981 | Bleeke | 123/198 D X |
| 4,513,706 | 4/1985 | Atzet | 261/44.4 X |
| 4,524,736 | 6/1985 | Sackett | 123/198 D |
| 4,755,790 | 7/1988 | Umehara | 123/198 DC |

FOREIGN PATENT DOCUMENTS 107850  6/1983  Japan .................................. 261/44.4

Primary Examiner—Tony M. Argenbright
Assistant Examiner—Erich Carlberg
Attorney, Agent, or Firm—Merchant, Gould, Smith, Edell, Welter & Schmidt

[57] ABSTRACT

An idle detector and safety apparatus for use in an internal combustion engine includes a magnet which is mounted to the carburetor piston valve and a magnetically actuatable switch positioned outside of the carburetor body. A sensor is also provided to indicate throttle position. When the throttle sensor indicates the throttle is in an idle position, a circuit checks the status of the magnetically actuatable switch. If the switch indicates that the piston valve is in the idle position as is proper, engine ignition is allowed to continue. If the switch indicates that the piston valve is improperly in a high speed position, engine ignition is caused to be interrupted. As a result, the engine is prevented from going into an uncontrolled, runaway condition should the piston valve become misplaced.

25 Claims, 5 Drawing Sheets

FIG. I
PRIOR ART

IDLE DETECTOR FOR INTERNAL COMBUSTION ENGINE

BACKGROUND OF THE INVENTION

1. Field of the Invention

The present invention relates to devices for preventing out of control acceleration in machines which are powered by internal combustion engines. More particularly, the present invention relates to an improved apparatus for monitoring the position of a carburetor piston valve in an internal combustion engine and a control circuit which shuts off the engine if the piston valve becomes stuck in an open position.

2. Description of the Prior Art

Carburetors for internal combustion engines commonly utilize piston valves to control the flow of fuel thereto prior to mixing the fuel with incoming air. Piston valves are controlled via a linkage connected to a throttle which is manipulated by an operator, and may be positioned for sliding movement within the carburetor body itself. In this way, the operator controls the supply of fuel to the carburetor, intake manifold and ultimately the combustion chambers of the engine itself.

One danger that is present in such arrangements is the runaway, uncontrolled engine speed that may result should the piston valve become stuck in its open position.

FIGS. 1 and 2 depict one system that has been commercially available for preventing such a runaway engine condition. In this system 10, a carburetor body 12 is provided with an outwardly protruding switch receiving socket 14, which has an inner bore that is at least partially threaded. A switch unit 16 having a threaded nipple 18 is screwed into socket 14. In order to monitor the movement of the piston valve 20, the piston valve is provided with a slide having a ramp 22 defined in a side surface thereof. A plunger 26 having a plastic end 24 is biased toward the ramp 22 to connect and disconnect switch 16. Switch 16 is connected to an ignition system by means of a connector 36.

Although it was somewhat effective in preventing runaway engine speeds, the above-described system had several disadvantages which became problematic in actual use. One such disadvantage was that wear on plastic end portion 24 and ramp 22 resulting from repeated use caused the switch activation point to change relative to the position of the piston valve. In addition, despite the provision of a relatively complicated and expensive system of seals, it was possible for gas and oil to leak from the carburetor into socket 14. Such seals substantially increased the complexity and cost of the switch. The added complexity of the switches further increased contact resistance, which causes spark plug fouling on engines which use capacitive discharge ignition systems.

A further disadvantage of the above-described system was that the added bulk created by socket 14 hindered efforts to reduce the size and weight of the engine.

Accordingly, it is clear that there has existed a long and unfilled need in the prior art for an improved piston valve detector device which has a constant point of actuation, does not allow fluids to leak from the carburetor and does not appreciably increase the bulk and weight of the carburetor assembly.

SUMMARY OF THE INVENTION

Accordingly, it is an object of the present invention to provide an apparatus for sensing the position of a piston valve in an internal combustion engine that has a constant point of actuation, does not allow fluid to leak from the carburetor and does not add appreciable weight or bulk to the carburetor assembly.

In order to achieve these objects, an internal combustion engine is provided, which has a capacitive discharge ignition circuit for initiating combustion of the liquid fuel; a carburetor for mixing the liquid fuel with air prior to combustion, including a carburetor body and a piston valve positioned for linear movement within the carburetor body between an idle range and a tower range, the throttle linkage movable between an idle range and a high speed range; a magnetic field generating device mounted to the piston valve so as to be movable therewith; a device for sensing whether the throttle linkage is positioned in the idle range; a device mounted on an outer surface of the carburetor body for sensing the presence or absence of magnetic flux, whereby the position of the piston valve is determined; and a device for deactivating the ignition circuit when the throttle sensing device indicates that the throttle is in its idle range and the magnetic field sensing device indicates the piston valve is not in its idle range, whereby an uncontrolled, runaway condition is prevented.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
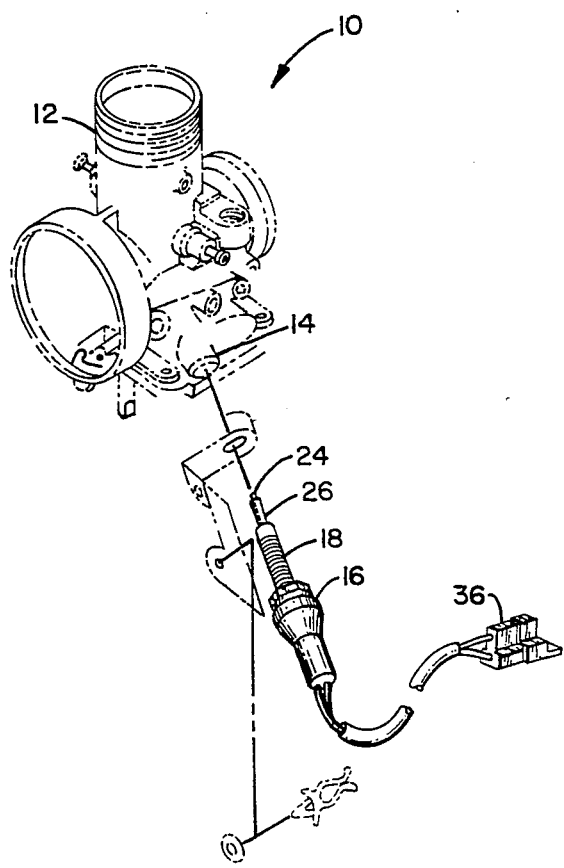
FIG. 1 is an exploded perspective view of a prior art engine shut off arrangement as previously described.
Figure 2:
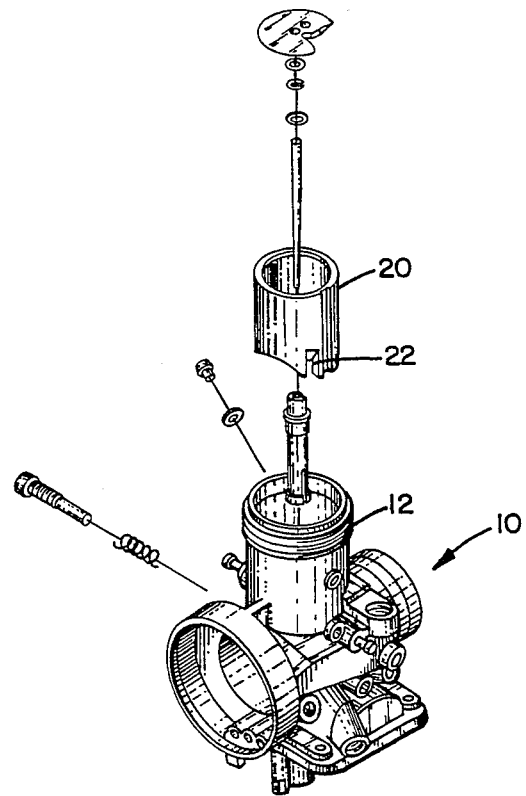
FIG. 2 is a second perspective view of the prior art arrangement depicted in FIG. 1.
Figure 3:
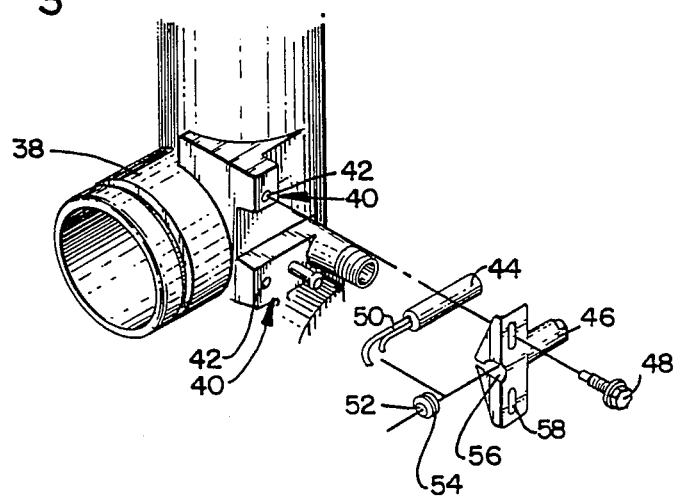
FIG. 3 is an exploded perspective view of a carburetor fitted with a piston valve detection indicator according to the present invention.
Figure 4:
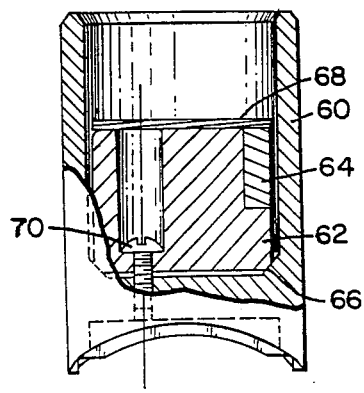
FIG. 4 is a view taken partially in cross-section of a piston valve provided with a magnetic field generator according to a first embodiment of the present invention.

Referring to FIG. 3, a carburetor body 38 is formed of a non-magnetic material, preferably aluminum, and is provided with a pair of mounting bosses 40 each having a threaded bore 42 defined therein. As is common in the art, a piston valve 60, which is depicted in FIG. 4, controls the flow of fuel and air to carburetor body 38 and is reciprocable within a bore defined therein. In the embodiment illustrated in FIG. 4, piston valve 60 has a magnet block 62 mounted in an interior space thereof by a mounting screw 70 so as to bear against a tapered seating surface 66. Tapered surface 66 provides proper alignment between block 62 and piston valve 60. Alternatively, such alignment may be effected by an additional alignment pin inserted between the two elements. A permanent magnet 64 is secured within a recess defined in magnet block 62 by an adhesive, and is further retained by a retainer plate 68. Magnet 64 is designed to have a magnetic field strong enough to penetrate the outer surface of piston valve 60 and extend through the carburetor body 38.

Referring again to FIG. 3, a magnetic reed switch 44 is secured proximate an outer surface of carburetor body 38 by a switch bracket 46 which is securable to mounting bosses 40 by a pair of mounting screws 48 which are threadably receivable within the threaded bores 42, respectively. As shown in FIG. 3, bracket 46 includes a pair of elongated adjustment holes 58 which allow reed switch 44 to be adjusted relative to the position of piston valve 60 within the carburetor body 38. In order to secure switch 44 between bracket 46 and the carburetor body 38, a grommet 52 is slipped over the wires 50 which extend from switch 44. Grommet 52 has an annular circumferential groove 54 defined therein which is receivable within a recess defined by a wall portion 56 in the switch bracket 46. During clamping of switch 44 by bracket 46, wall portion 56 will bear down upon grommet 52, which provides a compressive force onto the wires 50, thereby isolating switch 44 from any physical tension which may be applied to the wires 50.

Figure 5:
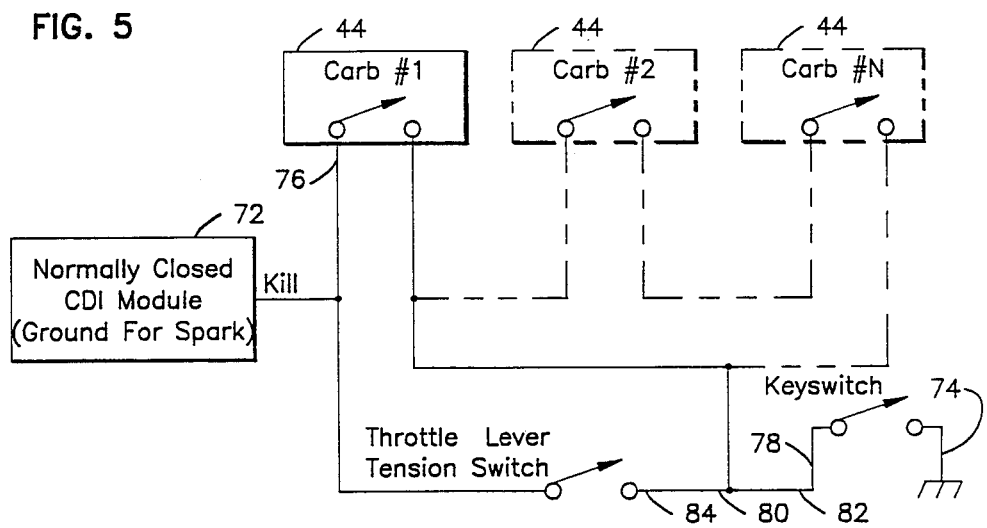
FIG. 5 is a schematic diagram of the instant invention being used in conjunction with a normally closed capacitive discharge ignition system.

FIG. 5 schematically represents another aspect of the instant invention, which is the application of the improved piston valve position detector within an engine runaway prevention system. In the embodiment of FIG. 5, each magnetic reed switch 44 is positioned on its respective carburetor body 38 so as to be in an electrically closed position when piston valve 60 is positioned within the idle range. A throttle position sensing switch 84 is provided and is arranged to be in an electrically open position when the throttle is set at its idle position or within an idle range.

The system illustrated in FIG. 5 is a "normally closed" capacitive discharge ignition system; that is, the CDI module 72 must be connected to ground 74 for the engine to operate. In the embodiment of FIG. 5, the CDI module 2 is provided with a direct electrical connection to both reed switch 44 and the throttle position sensing switch 84, which are arranged in a parallel type circuit relative to each other. That is, discharges from CDI module 72 have the choice of following a first path 76 through the reed switch 44 or a second path 80 through the throttle position sensing switch 84 before coming to a junction and combining into a third path 82. A common ignition key switch 78 is interposed between the third path 82 and ground 74, as is shown in FIG. 5. Additional carburetors may be connected so that their respective reed switches 44 are in a series circuit type arrangement with the reed type switch 44 of the first carburetor along the first path 76, as is illustrated in broken lines in FIG. 5.

In operation, an ignition circuit according to the embodiment of FIG. 5 operates as follows. When the ignition key switch 78 is on and the operator desires the engine to operate at a speed other than idle, throttle position sensing switch 84 will be closed, allowing ignition sparks to travel from CDI module 72 through the second and third paths 80, 82 to ground 74, regardless of the position of the magnetic reed switches 44. If the operator desires to idle the engine, the throttle position sensing switch 84 will open, requiring the ignition discharge to travel through first path 76 if it is to make its way to the third path 82 and ground 74. If piston valve 60 is properly in its idle position, switch 44 will be closed and the engine will operate as normal. However, if piston valve 60 is improperly stuck in a high speed position, reed switch 44 will open, interrupting electrical continuity along the first path 76 and thus preventing ignition signals from reaching ground 74. As a result, the engine will not run. In the case of additional carburetors, electrical continuity along first path 76 will likewise be destroyed if the piston valve in any one of the carburetors is improperly positioned. Thus, a runaway engine condition is prevented.

Figure 6:
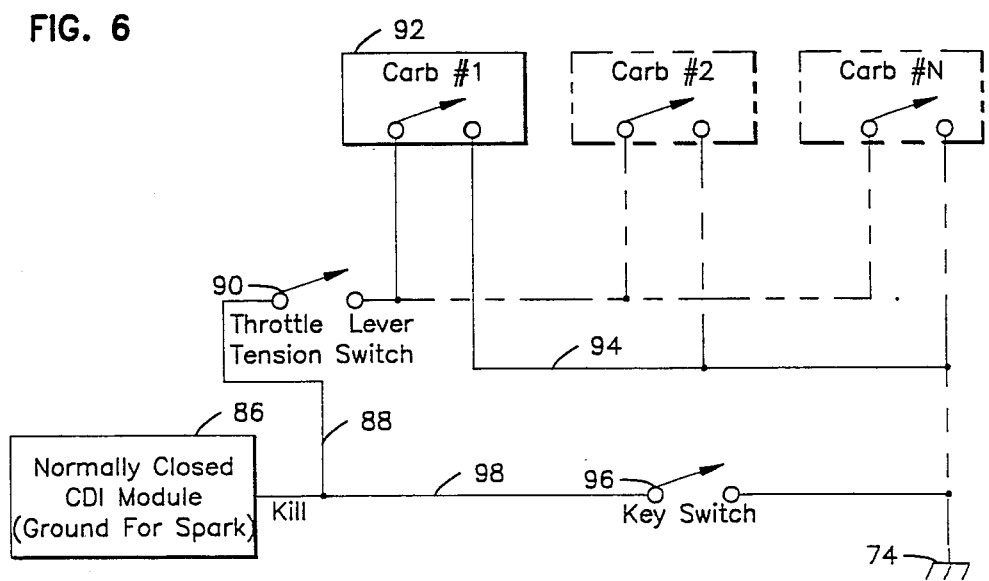
FIG. 6 is schematic diagram indicating the instant invention being used in conjunction with a normally open type capacitive discharge ignition system.

A second ignition circuit embodiment is schematically represented in FIG. 6. In this embodiment, the engine will operate only if no electrical connection is established between the "normally open" CDI module 86 and ground 74. In this embodiment, a throttle position sensing switch 90 is provided which electrically closes when the throttle is positioned at an idle position or within an idle range. A magnetic reed switch 92 is positioned at each of the carburetors so as to electrically open when the respective piston valve in an idle position or within an idle range. An ignition key switch 96 is constructed so as to be in the open position when the operator desires the engine to operate. As shown in FIG. 6, CDI module 86 is electrically connected throttle position sensing switch 90 via a first path 88, and switch 90 is connected at its other end to reed switch 92, which in turn discharges through a second path 94 to ground 74. In this embodiment, additional carburetor switches 92 are connected in a parallel circuit arrangement with the first carburetor, and in series with switch 90 in the same manner as the first carburetor. Assuming key switch 96 is in the "on" position and is electrically open, contact will be made between CDI module 86 and ground 74 only if both switches 90, 92 are closed. If the engine is operating at a speed other than idle, the throttle position sensing switch 90 will remain open, thus precluding engine shut off. If the throttle is positioned at idle, switch 90 will close but the engine will not be caused to shut down if the piston valves are in their proper idle position within the carburetors, since switches 92 will remain open. However, if one of the piston valves 60 is improperly positioned, the corresponding switch 92 will close, thus establishing connection between module 86 and ground 74, which shuts off the engine.

Figure 7:
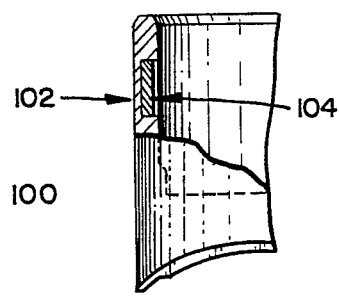
FIG. 7 is a side view taken partially in cross-section of a magnetic field generating device constructed according to a second embodiment of the instant invention.
Figure 8:
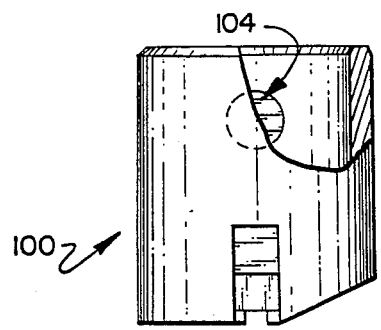
FIG. 8 is a different side view of the arrangement depicted in FIG. 7, with parts broken away for clarity.

An alternative magnet mounting structure is depicted in FIGS. 7 and 8. In this embodiment, a disc shaped permanent magnet 104 is secured within a circular recess 102 that is defined in the inner surface of piston valve 100. Of course, magnet 104 must be of sufficient strength so that its flux penetrates the remaining thin wall of piston valve 100 and carburetor body 38.

Figure 9:
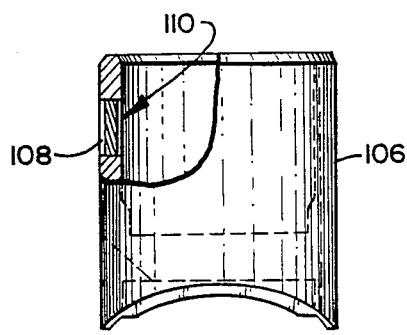
FIG. 9 is a side view taken partially in cross-section of a third embodiment of a magnetic field generating device according to the instant invention.
Figure 10:
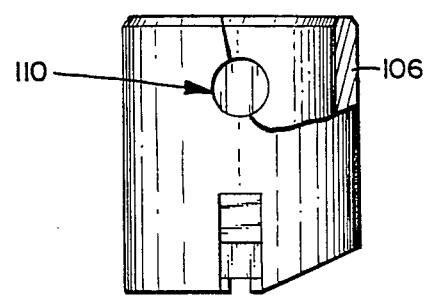
FIG. 10 is a different side view of the apparatus illustrated in FIG. 9 with parts broken away for clarity.

A third magnet mounting embodiment is depicted in FIGS. 9 and 10. In this embodiment, a circular bore 108 is formed in the wall of piston valve 106. A disc shaped magnet 110 is secured within bore 108 so that its flux does not need to overcome the resistance of the wall of the piston valve. The flux from magnet 110 needs only to penetrate the wall of carburetor body 38 and thus does not need to be as powerful as the magnets provided in the embodiments of FIGS. 4, 7 and 8.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A safety apparatus for use in an internal combustion engine of the type having an ignition spark circuit, a throttle that is positionable in an idle range, a carburetor body and a piston valve positioned for linear movement within the carburetor body between an idle range and a power range, the safety apparatus comprising:
    magnetic field generating means adapted for mounting to the piston valve so as to be movable therewith;
    means adapted for sensing whether the throttle is positioned in the idle range;
    means adapted for mounting on a predetermined section of an outer surface of the carburetor body for sensing whether said magnetic field from said magnetic field generating means is present so that the position of the piston valve is determined; and
    means responsive to said throttle sensing means and said magnetic field sensing means for deactivating the ignition spark circuit when said throttle sensing means indicates that the throttle is in its idle range and said magnetic field sensing means indicates that the piston valve is not in its idle range, whereby an uncontrolled, runaway condition is prevented.

2. Apparatus according to claim 1, wherein said magnetic field generating means comprises a magnet block adapted for mounting onto the piston valve, a permanent magnet and means for securing said permanent magnet to said magnet block.

3. Apparatus according to claim 2, wherein said securing means comprises a recess defined in said magnet block, and a retainer plate positionable over said recess to retain said magnet in said recess.

4. Apparatus according to claim 1, wherein said throttle position sensing means comprises an electric switch.

5. Apparatus according to claim 1, wherein said magnetic field sensing means comprises a reed-type magnetically actuatable electric switch.

6. Apparatus according to claim 4, wherein said magnetic field sensing means comprises a reed-type magnetically actuatable electric switch.

7. Apparatus according to claim 6, wherein said reed-type switch is adapted to be positioned over the carburetor body so that it closes when the piston valve is in its idle range.

8. Apparatus according to claim 7, wherein said throttle position switch is adapted to open when the throttle is in its idle range, and said reed-type switch and throttle position switch are adapted to be interposed in a parallel circuit type arrangement between a CDI module and ground in a normally closed type ignition system.

9. Apparatus according to claim 6, wherein said reed-type switch is adapted to be positioned over the carburetor body so that it opens when the piston valve is in its idle range.

10. Apparatus according to claim 9, wherein said throttle position switch is adapted to close when the throttle is in its idle range, and said reed-type switch and throttle position switch are adapted to be interposed in a series circuit type arrangement between a CDI module and ground in a normally open type ignition system.

11. An internal combustion engine of the type which is adapted to combust liquid fuel and convert the gaseous expansion so derived into mechanical energy, comprising:
    capacitive discharge ignition circuit means for initiating combustion of the liquid fuel;
    carburetor means for mixing the liquid fuel with air prior to combustion, comprising a carburetor body and a piston valve positioned for linear movement within said carburetor body between an idle range and a power range;
    a throttle linkage movable between an idle range and a high speed range;
    magnetic field generating means mounted to said piston valve so as to be movable therewith;
    means for sensing whether said throttle linkage is positioned in the idle range;
    means mounted on an outer surface of said carburetor body for sensing the presence or absence of magnetic flux, whereby the position of said piston valve is determined; and
    means for deactivating said ignition circuit means when said throttle sensing means indicates that the throttle is in its idle range and said magnetic field sensing means indicates that the piston valve is not in its idle range, whereby an uncontrolled, runaway condition is prevented.

12. Apparatus according to claim 11, wherein said magnetic field generating means comprises a recess defined in an inner surface of said piston valve, and a permanent magnet positioned in said recess.

13. Apparatus according to claim 12, wherein said recess is defined to have a cylindrical shape.

14. Apparatus according to claim 11, wherein said magnetic field generating means comprises a bore defined in said piston valve, and a permanent magnet disposed in said bore.

15. Apparatus according to claim 14, wherein said bore is defined to have a cylindrical shape.

16. Apparatus according to claim 11, wherein said magnetic field generating means comprises a magnetic block mounted onto said piston valve, a permanent magnet and means for securing said permanent magnet to said magnet block.

17. Apparatus according to claim 16, wherein said securing means comprises a recess defined in said magnet block, and a retainer plate positionable over said recess to retain said magnet in said recess.

18. Apparatus according to claim 11, wherein said throttle position sensing means comprises an electric switch.

19. Apparatus according to claim 11, wherein said magnetic field sensing means comprises a reed-type magnetically actuatable electric switch.

20. Apparatus according to claim 18, wherein said magnetic field sensing means comprises a reed-type magnetically actuatable electric switch.

21. Apparatus according to claim 20, wherein said reed-type switch is positioned over said carburetor body so that it closes when said piston valve is in its idle range.

22. Apparatus according to claim 21, wherein said throttle position switch opens when said throttle is in its idle range, and said reed-type switch and throttle position switch are interposed in a parallel circuit type arrangement between a CDI module and ground in a normally closed type ignition system.

23. Apparatus according to claim 20, wherein said reed-type switch is positioned over said carburetor body so that it opens when said piston valve is in its idle range.

24. Apparatus according to claim 23, wherein said throttle position switch closes when said throttle is in its idle range, and said reed-type switch and throttle position switch are interposed in a series circuit type arrangement between a CDI module and ground in a normally open type ignition system.

25. An apparatus for detecting the position of a piston valve within a carburetor body, comprising:
   a permanent magnet adapted to be mounted to the carburetor body for movement therewith;
   a magnetically actuatable electric switch which opens and closes in response to magnetic flux from said permanent magnet; and
   means adapted for mounting said switch to the carburetor body in a position where said switch would be opened and closed during normal operation of the piston valve, whereby the position of the piston valve controls said switch.

* * * * *

UNITED STATES PATENT AND TRADEMARK OFFICE
CERTIFICATE OF CORRECTION

PATENT NO. : 4,862,850

DATED : September 5, 1989

INVENTOR(S) : Janisch et al.

It is certified that error appears in the above-identified patent and that said Letters Patent is hereby corrected as shown below:

Column 1, line 16
    "15" should be deleted

Column 1, line 16
    "Carburetors" should begin a new paragraph

Column 3, line 60
    "2" should be --72--

Column 4, line 39
    --is-- should be inserted after "valve"

In Figure 6 of the drawings, please change the legend in the block which presently reads "Normally Closed CDI Module (Ground For Spark)" to --Normally Open CDI Module (Open For Spark)--

Signed and Sealed this

Eleventh Day of February, 1992

Attest:

HARRY F. MANBECK, JR.

*Attesting Officer*  *Commissioner of Patents and Trademarks*